Feb. 5, 1929.    1,701,259
M. L. CROSSLEY ET AL
SALTS OF BETA NAPHTHOL SULPHONIC ACIDS AND PROCESS
OF MAKING THE SAME AND OF OBTAINING SEPARATE SALTS
Filed Oct. 14, 1922
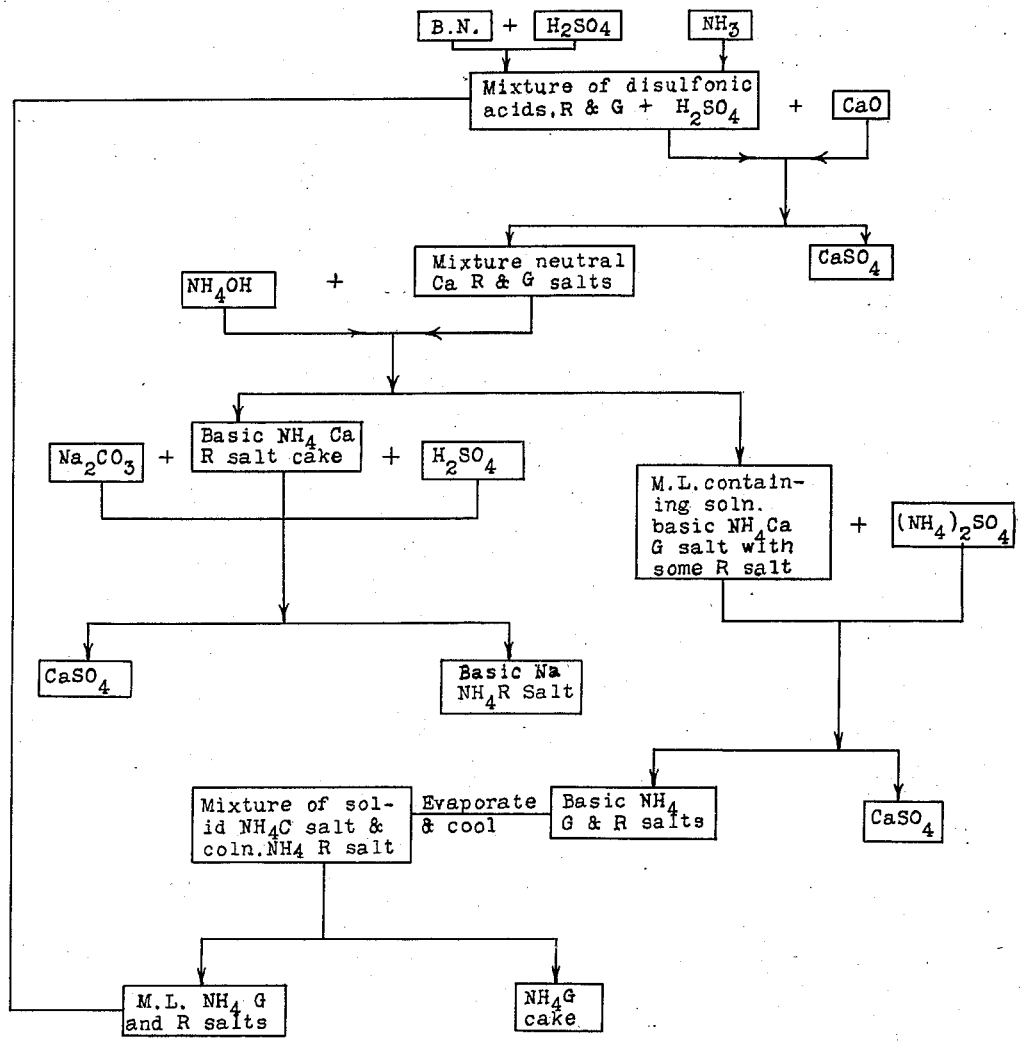
INVENTOR.
Moses L. Crossley.
George S. Simpson
BY
ATTORNEYS.

Patented Feb. 5, 1929.

1,701,259

UNITED STATES PATENT OFFICE.

MOSES L. CROSSLEY, OF SOMERVILLE, AND GEORGE S. SIMPSON, OF PLAINFIELD, NEW JERSEY, ASSIGNORS TO THE CALCO CHEMICAL COMPANY, OF BOUNDBROOK, NEW JERSEY, A CORPORATION OF NEW JERSEY.

SALTS OF BETA NAPHTHOL SULPHONIC ACIDS AND PROCESS OF MAKING THE SAME AND OF OBTAINING SEPARATE SALTS.

Application filed October 14, 1922. Serial No. 594,608.

The present invention relates to a process for obtaining separately the salts of beta-naphthol sulphonic acids from mixtures of such acids,—to a series of new products which are salts of said acids, and to processes of making these salts.

In sulphonating beta-naphthol to form the sulphonic acids of beta-naphthol, it has not been possible to obtain one acid only but the sulphonation results in a mixture of such acids, the component acids of the mixture and the proportions of each varying according to the working conditions. It has been known that by carrying out the sulphonation under certain conditions it is possible to produce a mixture which consists chiefly of the disulphonic acids known as R-acid and G-acid or 2=3=6 and 2=6=8 naphthol disulphonic acids. These acids, in order to be utilized, must be separated. Heretofore the separation of them has been troublesome and expensive. We have discovered some new salts of R- and G-acids of such a nature that the corresponding salts of the two acids have considerable difference in solubility, whereby it becomes possible to separate the salts, as will more fully appear from the description hereinafter. From each of these separate salts may then be produced the desired individual acid or salt.

According to our invention a mixture of beta-naphthol polysulphonic acids of the general type $$R(SO_3H)_n.(OH).X$$

is converted into a mixture of salts of any one of the following types, viz—

(1) $R.(SO_3)_nM^a.(OM).X$
(2) $[R(SO_3)_nM^a.X.O]_2M^b$
(3) $[R(SO_3M)_n.X.O]_2M^b$

In these formulæ,—

R indicates a tetravalent radical of naphthalene, viz, $C_{10}H_4$; 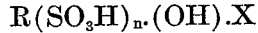

X represents hydrogen or a substituent such as a halogen, or an alkyl, aryl, nitro or amido group.;

n indicates the number of sulphonic acid groups (not less than two);

M indicates generally any monovalent metal, including the hypothetical compound metal, ammonium;

$M^a$ indicates a polyvalent metal whose valency$=n$; and $M^b$ indicates a divalent metal.

We have found that a beta-naphthol salt of poly-sulphonic acid which comes under any of the four types designated by the formulæ hereinabove set forth, will be quite different in solubility from the corresponding salt of the isomeric beta-naphthol polysulphonic acid.

To illustrate the matter concretely, a calcium salt of R-acid represented by the first formula will be much less soluble than the similar salt of G-acid, and the ammonium salt of G-acid will be much less soluble than the corresponding salt of R-acid.

Having thus produced a mixture of salts of different solubilities, one of the salts can be crystallized out, leaving the more soluble salt in the solution. The crystallized salt is removed by filtration.

Then the filtrate containing the soluble salt is treated to convert such soluble salt into an ammonium salt, which, on account of its lesser solubility, may be recovered in part by evaporation and filtration, or by other suitable methods, as, for example, by salting out with ammonium chloride.

Although the mother liquor may contain an appreciable residual amount of the ammonium sulphonate, this is not lost, because the mother liquor containing it may be added to subsequent batch mixtures at any desirable point in the course of the reaction and restored to a condition which permits the beta-naphthol sulphonate to be ultimately recovered as a salt.

Where the more soluble salts are treated to convert them into ammonium salts, as hereinbefore referred to, there is no possibility of injuring the subsequent batch mixture by returning the mother liquor, no matter what particular metals are used to produce the desired salts in the batch mixture, because the ammonium salts, if decomposed, will give off ammonia, which will escape from the mixture. This ammonia may be recovered if desired.

We will now give a few examples of processes embodying our invention.

Example 1.

A solution containing a mixture of beta-naphthol sulphonic acids which are principally R and G-acids is neutralized with a calcium compound to form the neutral calcium salts of the said acids. This solution of said calcium salts which is freed in the usual way from any insoluble salts, is well known in the art, and serves as the starting material for carrying out the invention.

Instead of neutralizing the mixture of acids with a calcium compound, we may use a compound containing any other metal of the alkaline earths (strontium or barium), which, it will be noted, are divalent.

The neutral calcium salts of the R and G-acids may be represented as follows:

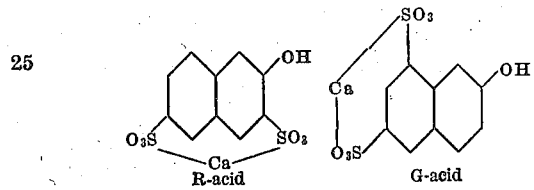

The mixture of neutral salts in the starting solution are now converted into basic salts, by treating the solution with the hydroxide of a divalent metal, usually a metal of the alkaline earth.

If we assume that the solution of the mixed neutral calcium salts of R and G-acids above referred to is treated with calcium hydroxide, there will be produced a tri-calcium salt of R-acid and a tri-calcium salt of G-acid. The former is much less soluble than the latter and will separate from the solution so that by filtration it may be recovered.

The tri-calcium salts of the R and G-acids probably have the following formulæ:

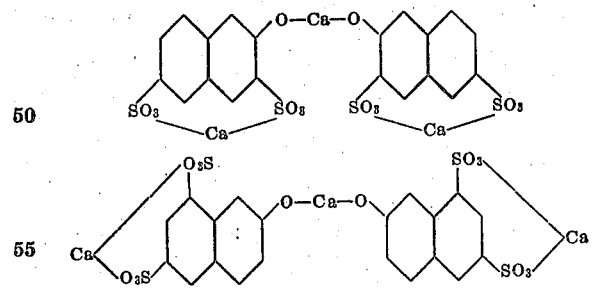

If the basic salts are formed by the use of a hydroxide of a metal different from the metal of the compound used in forming the neutral salts, results will generally be equally satisfactory. For example, if the neutral salts are calcium salts, and strontium hydroxide is employed for converting the neutral salts into basic salts, the result will be the formation of the mono-strontium di-calcium salts of the R and G-acids, and these salts will differ in solubility to such an extent that the basic R-salts may be separated out by filtration, leaving the basic G-salts in the solution.

From the above explanation it will be clear that the following basic salts of R and G-acids with calcium, barium, and strontium may be formed, viz—

Tri-calcium, tri-barium, tri-strontium, mono-barium-di-calcium, mono-strontium-di-calcium, mono-calcium-di-barium, mono-strontium-di-barium, mono-calcium-di-strontium and mono-barium-di-strontium salts.

The basic R-salts produced as above explained are washed free of the mother liquor and are then ready for use in the arts. They are very suitable for conversion into individual soluble neutral salts, such as the sodium, potassium or ammonium salts by the usual methods familiar to those skilled in the art.

The mother liquor containing the basic G-salt is treated with a suitable ammonium salt such as a sulphate, carbonate, oxalate or phosphate of ammonium, whereby the basic G-salt is converted into the corresponding ammonium G-salt. This is represented by the following formula:

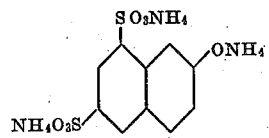

The insoluble sulphate, carbonate, oxalate, or phosphate of the di-valent metal, calcium, strontium or barium or a mixture of two of said metals is filtered from the mother liquor, which is a solution of the corresponding ammonium G-salt. This liquor is evaporated to the crystallization point and the concentrated liquor then cooled. The ammonium G-salt is filtered off, washed and dried. The mother liquor from this, which still contains some residual ammonium G-salt, and generally some R-salt, is added to the subsequent batch mixtures of the neutral sulphonates of the particular alkaline earth metal employed in the process, and they will ultimately be recovered in the process.

Example 2.

The solution of neutral alkaline earth salts of mixed sulphonic acids used as the starting material for Example 1, serves as the starting material in this example. This solution is made alkaline with the requisite amount of ammonium hydroxide, and the sparingly soluble ammonium-di-calcium (or strontium or barium) R-salt precipitated and filtered off from the corresponding soluble G-salt. The R-salt is washed free of G-salt and is ready for use in the arts. It serves as a starting material for the production of other R-salts and particularly for the production of soluble R-salts.

There are at least two known methods of converting the basic R-salt above described into other salts, as follows:

(1) The basic R-salt is first treated with an acid such as sulphuric acid to convert it into the neutral salt and then the mixture is treated with a metallic salt of an acid which will form insoluble salts with the alkaline earth metals, as, for example, sodium sulphate, sodium carbonate or the like, or (2) The basic R-salt is converted directly into the corresponding soluble basic salt, for example, the basic sodium, potassium or ammonium salt by treating the basic R-salt with the equivalent amount of a metallic salt of an acid which will form insoluble salts of the alkaline earths.

The mother liquor which remains after the separation of the R-salt, and which contains the basic ammonium-calcium (or strontium or barium) G-salt is treated with the equivalent amount of ammonium sulphate, carbonate, oxalate or phosphate, to produce the ammonium G-salt. The solution is filtered to remove the insoluble alkaline earth salt and the filtrate is evaporated to the crystallization point and cooled. Then it is again filtered to remove the bulk of the ammonium G-salt.

The mother liquid containing the residual ammonium-R- and G-salts may be returned to subsequent batch mixtures and will be recovered ultimately as calcium R and ammonium G-salts.

*Example 3.*

The solution of mixed acid calcium (or strontium or barium) sulphonates consisting chiefly of acid salts of R and G-acids obtained by partly neutralizing a mixture of beta-naphthol sulphonic acids serves as the starting material for this example.

This solution is treated with a sufficient amount of a suitable ammonium compound, particularly ammonium hydroxide to convert the R and G salts into basic ammonium-calcium (or strontium or barium) salts.

The sparingly soluble R-salt thus obtained is separated by filtration and constitutes a product which may serve as a starting material for the formation of other R-salts. It may be treated in a known manner to obtain the other salts by either of the processes (1) and (2) described under Example 2.

The mother liquor remaining after the removal of the R-salt may be treated as described in Examples 1 and 2 to convert the basic ammonium-calcium (or strontium or barium) G-salt into the ammonium G-salt which may be recovered in the same way as stated in those examples, and the remaining mother liquor returned to subsequent batch mixtures as previously explained.

*Example 4.*

The starting material used in Examples 1 and 2 and comprising a solution of mixed neutral beta-naphthol sulphonic acid salts of the alkaline earths, and chiefly the R and G-acid salts is employed as the starting material for this example.

This solution is first treated with a suitable potassium salt such as the carbonate, or the sulphate, to convert the mixed salts of the alkaline earth metals into neutral potassium sulphonates. The solution is freed of insoluble salts by filtration. The filtrate is then rendered alkaline with the requisite amount of lime or calcium hydroxide, whereby there is produced a sparingly soluble potassium-calcium R-salt and the corresponding G-salt, which, however, is more soluble. The basic R-salt is filtered off. It serves as a starting material for the production of other R-salts and may be treated as hereinbefore described.

The mother liquor containing the basic potassium-calcium G-salt is then treated with the requisite amount of a suitable ammonium salt, for example, the carbonate or the sulphate, and converted into the corresponding ammonium G-salt.

The solution may then be evaporated to the crystallization point and the potassium ammonium G-salt removed.

The mother liquor remaining and which will contain residual potassium ammonium R- and G-salts may be returned to a subsequent batch mixture without interfering with the process in any way. In this way the salts which remained in the mother liquor are ultimately recovered.

*Example 5.*

The copper salt of R-acid is made by treating neutral calcium R-salt solution with the required amount of suitable copper salt of an acid which will form insoluble salts with the alkaline earth metals, as, for example, copper sulphate, the insoluble salts are removed by filtration and the solution of copper R-salt evaporated to the crystallization point. This solution is then allowed to cool to room temperature and filtered. The copper salt so obtained is dried and is then suitable for use as such or for conversion into other soluble neutral salts, such as the sodium, potassium, or ammonium salts by the usual methods familiar to those skilled in the art.

Instead of treating the neutral calcium R-salt solution with a copper compound we may use a compound containing certain other similar metals, such as iron, cobalt and nickel and obtain the corresponding R-salts.

The corresponding salts of G-acid are obtained in a similar manner from the neutral calcium salt by similar treatment with the specified metals.

It will be noted that all the beta-naphthol sulphonic acid salts produced in accordance with our invention may be represented by the following Formula of $\frac{2}{n}$ molecules

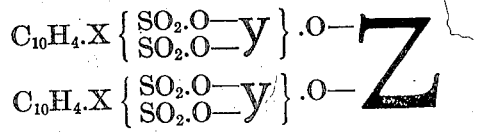

In this formula—

X indicates hydrogen or a substituent such as halogen or an alkyl, aryl, nitro, amido, etc., group.

Y indicates either (1) one atom of hydrogen and one atom of monovalent metal separately satisfying the oxygen bonds, or (2) two ammoniums or two atoms of different monovalent metals separately satisfying the oxygen bonds or (3) one atom of a divalent metal.

Z indicates the following:

(a) When Y represents two ammoniums or one K and one Na or one Cu, Ni, Fe, or Co, then Z indicates either (1) two atoms of hydrogen or of a monovalent metal separately satisfying the oxygen bonds, or (2) one atom of a divalent metal.

(b) When Y has any other of its values than those set forth under (a) then Z indicates either (1) two atoms of a monovalent metal separately satisfying the oxygen bonds or (2) one atom of a divalent metal.

$n$ indicates the highest valency of any element included under Z, that is, if Z is a divalent metal, $n=2$ and the formula is the usual formula for one molecule. If Z represents two atoms of a monovalent metal or of hydrogen, $n=1$ and the formula is in duplicate, that is to say, represents two molecules of the salt.

By following the methods hereinbefore explained we have succeeded in producing a large number of new salts of great value in the art. A list of those not heretofore referred to and their solubilities now follows:

| Salt | Probable formula | Characterization | |
|---|---|---|---|
| | | Color | 100 cc. sat. aq. sol. contains at 25° C. |
| Mono-ammonium R | 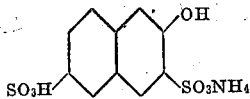 | White solid | 73.4 |
| Mono-ammonium G | 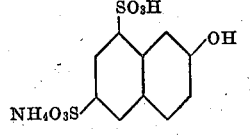 | White solid | 30.1 |
| Di-ammonium R | 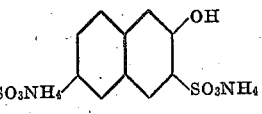 | Gray white solid | 64.7 |
| Di-ammonium G | 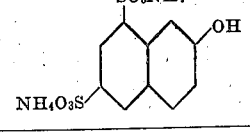 | White solid | 30.2 |
| Sodium-potassium R | 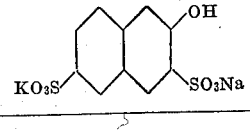 | Yellow solid | 23 |
| Cupric R | 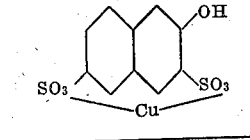 | Gray white solid | 41.4 |

| Salt | Probable formula | Characterization | |
|---|---|---|---|
| | | Color | 100 cc. sat aq. sol. contains at 25° C. |
| Nickel R | 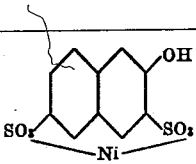 | Light green solid | 15.4 |
| Ferrous R | 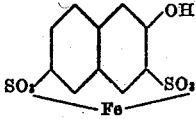 | Bluish grey solid | 17.5 |
| Cobaltous R |  | Pink solid | 17.4 |
| Tri-calcium R | 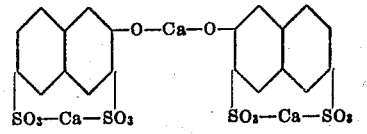 | White solid | 2.5 |
| Tri-calcium G | 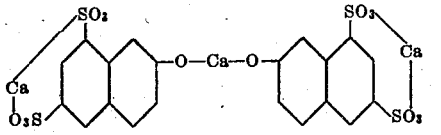 | White solid | 22.6 |
| Potassium di-sodium R | 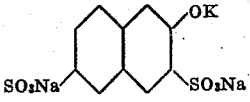 | Yellow solid | 24.6 |
| Sodium-di-potassium R |  | Light yellow solid | 31 |
| Di-potassium-di-calcium R | 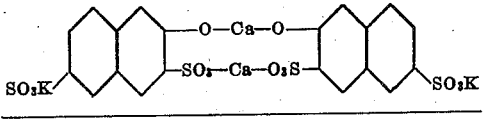 | White solid | .77 |
| Di-sodium-di-calcium R | 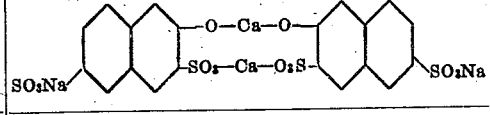 | White solid | 2.8 |
| Mono-calcium-tetra sodium R | 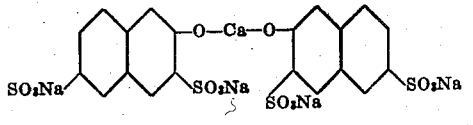 | Yellowish white solid | 7.4 |
| Tri-sodium R | 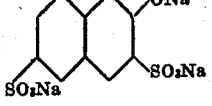 | Lemon yellow solid | 21 |

| Salt | Probable formula | Characterization | |
|---|---|---|---|
| | | Color | 100 cc. sat. aq. sol. contains at 25° C. |
| Tri-sodium G | [structure with SO₃Na, ONa, SO₃Na] | White solid | 59 |
| Tri-potassium R | [structure with OK, SO₃K, SO₃K] | Golden yellow solid | 34.6 |
| Tri-potassium G | [structure with SO₃K, OK, SO₃K] | White solid | 23.5 |
| Tri-ammonium R | [structure with ONH₄, SO₃NH₄, SO₃NH₄] | Grey white solid | 69 |
| Tri-ammonium G | [structure with SO₃NH₄, ONH₄, SO₃NH₄] | White solid | 33.1 |
| Di-calcium-di-ammonium R | [structure with O—Ca—O, SO₃—Ca—O₃S, SO₃NH₄, SO₃NH₄] | Grey white solid | 3 |
| Mono-ammonium-calcium G | [structure with SO₃, Ca, SO₃, ONH₄] | White solid | 35.4 |
| Mono-potassium-calcium G | [structure with SO₃, Ca, SO₃, OK] | White solid | 27.4 |

It will have been observed, among other things, that applicants have produced a salt comprising a univalent positive ion of the type which could form a distinctly alkaline base.

The basic salts of beta naphthol disulphonic acids described in the specification are the salts formed by the replacement of both the hydrogens of the two sulphonic acid groups and the hydrogen of the hydroxyl group. The neutral salts of beta naphthol disulphonic acids referred to herein are the salts formed by the replacement of only the hydrogen of each of the sulphonic groups by the metal corresponding to the compound used for the neutralization. The acid salts of beta naphthol disulphonic acids are the salts formed by the replacement of the hydrogen of only one of the sulphonic acid groups by the metal corresponding to the compound used.

In the drawing is illustrated a flow sheet setting out the steps of the process with the products obtained.

What is claimed is:

1. The process for obtaining individual beta-naphthol salts of di-sulphonic acids from a solution containing a mixture of beta-naphthol di-sulphonic acids, which consists in treating said solution with a compound of an alkaline earth metal to form the corresponding mixture of neutral salts of the acids, filtering to remove the solids, treating the filtrate with the hydroxide of an alkali forming metal, whereby the neutral salts are converted into basic salts of the said acids, crystallizing and filtering out the salt of low solubility, treating the mother liquor with an ammonium salt of an acid forming an insoluble salt with the alkaline earth metal, filtering to remove the insoluble salt, evaporating to concentrate the solution and crystallize out the ammonium salt of the beta-naphthol di-sulphonic acids, then filtering to remove the said crystallized salt, and returning the mother liquor to a subsequent batch mixture, to recover any residual salt of the beta-naphthol di-sulphonic acids.

2. As a new product, a salt of a beta-naphthol di-sulphonic acid, said salt containing two atoms of metal at least one of which is a divalent metal.

3. As a new product, a basic salt of a beta-naphthol di-sulphonic acid, said salt containing at least one atom of a divalent metal.

4. As a new product, a basic salt of a beta-naphthol di-sulphonic acid, said salt containing two atoms of divalent metal.

5. As a new product, a basic salt of a beta-naphthol disulphonic acid, said salt having two positive ions of the type which could form a distinctly alkaline base.

6. As a new product, a salt of a beta-naphthol di-sulphonic acid, said salt containing an ammonium ($NH_4$) group, substantially as described.

7. As a new product, a basic salt of a beta-naphthol di-sulphonic acid, said salt containing at least two atoms of monovalent metal.

8. The process for obtaining individual beta-naphthol salts of disulphonic acids from a solution containing a mixture of beta-naphthol disulphonic acids, which consists in treating said solution with a compound of an alkaline earth metal to form the corresponding mixture of neutral salts of the acids, filtering to remove the solids, treating the filtrate with the hydroxide of an alkali forming metal, whereby the neutral salts are converted into basic salts of the said acids, crystallizing and filtering out the salt of low solubility, treating the mother liquor with ammonium sulphate, filtering to remove the insoluble salt, evaporating to concentrate the solution and crystallize out the ammonium salt of the beta-naphthol disulphonic acids, then filtering to remove the said crystallized salt, and returning the mother liquor to a subsequent batch mixture, to recover any residual salt of the beta-naphthol disulphonic acids.

9. In the process for obtaining individual beta naphthol salts of disulphonic acids from a mixture of beta naphthol disulphonic acids the steps which consist in converting a mixture of the neutral alkaline earth salts of such acids into a mixture of alkali earth metal basic salts, separating the less soluble salt from the more soluble ones by crystallization and filtration, treating the mother liquor with an ammonium salt of an acid forming an insoluble salt with the metal in the basic salt to form a salt comprising a univalent positive ion of the type which could form a distinctly alkaline base, and filtering the latter salt substantially as described.

10. In the process for obtaining individual beta naphthol salts of disulphonic acids from a mixture of beta naphthol disulphonic acids the steps which consist in treating a mixture of neutral alkali earth metal salts of beta naphthol disulphonic acids with a hydroxide of an alkali forming metal to form the basic salts, separating the less soluble salt from the more soluble ones by crystallization and filtration, treating the mother liquor with an ammonium salt of an acid forming an insoluble salt with the metal in the basic salt to form a salt comprising a univalent positive ion of the type which could form a distinctly alkaline base, and filtering the latter salt substantially as described.

11. As a new product, a salt of a beta naphthol disulphonic acid, said salt containing a monovalent metal and a divalent metal.

12. As a new product, a salt of a beta naphthol disulphonic acid, said salt containing two atoms of a monovalent metal and two atoms of a divalent metal.

13. As a new product, a salt of a beta naphthol disulphonic acid, said salt containing two atoms of ammonium and two atoms of calcium.

In testimony whereof, we have hereunto set our hands.

MOSES L. CROSSLEY.
GEORGE S. SIMPSON.